US012514833B2

(12) United States Patent
Portolés Pérez et al.

(10) Patent No.: US 12,514,833 B2
(45) Date of Patent: Jan. 6, 2026

(54) COMBINATION OF IBUPROFEN AND TRAMADOL FOR RELIEVING PAIN

(71) Applicant: FARMALÍDER, S.A., Madrid (ES)

(72) Inventors: Antonio Portolés Pérez, Madrid (ES); Luis Narciso Santé Serna, Madrid (ES); María del Rosario Salas Butrón, Madrid (ES); Emilio Vargas Castrillón, Madrid (ES); Carlos Calandria Pérez, Madrid (ES); Raquel Horcajada Córdoba, Madrid (ES); Ángel José Muñoz Ruiz, Seville (ES); Marta Vicario De La Torre, Madrid (ES); Nuria Sanz Menéndez, Madrid (ES); Antonia Gómez Calvo, Madrid (ES); José Ángel Sánchez García, Madrid (ES); Ester Duart González, Madrid (ES); Fernando García Alonso, Madrid (ES)

(73) Assignee: FARMALÍDER, S.A., Alcobendas (ES)

( * ) Notice: Subject to any disclaimer, the term of this patent is extended or adjusted under 35 U.S.C. 154(b) by 920 days.

(21) Appl. No.: 17/624,601

(22) PCT Filed: Jul. 8, 2020

(86) PCT No.: PCT/EP2020/069306
§ 371 (c)(1),
(2) Date: Jan. 4, 2022

(87) PCT Pub. No.: WO2021/005129
PCT Pub. Date: Jan. 14, 2021

(65) Prior Publication Data
US 2022/0249414 A1 Aug. 11, 2022

(30) Foreign Application Priority Data
Jul. 9, 2019 (EP) .................... 19382583

(51) Int. Cl.
*A61K 31/192* (2006.01)
*A61K 9/00* (2006.01)
*A61K 9/16* (2006.01)
*A61K 31/135* (2006.01)
*A61P 29/00* (2006.01)

(52) U.S. Cl.
CPC .......... *A61K 31/192* (2013.01); *A61K 9/0019* (2013.01); *A61K 9/1623* (2013.01); *A61K 31/135* (2013.01); *A61P 29/00* (2018.01)

(58) Field of Classification Search
CPC ............... A61K 31/192; A61K 9/0019; A61K 9/1623; A61K 31/135; A61P 29/00
USPC ...................................................... 514/570
See application file for complete search history.

(56) References Cited

U.S. PATENT DOCUMENTS

| | | |
|---|---|---|
| 3,652,589 A | 3/1972 | Flick et al. |
| 5,510,385 A | 4/1996 | Stroppolo et al. |
| 6,211,246 B1 | 4/2001 | Gelotte et al. |
| 6,251,945 B1 | 6/2001 | Einig et al. |
| 6,342,530 B1 | 1/2002 | Darko |
| 6,727,286 B2 | 4/2004 | Pavliv |
| 7,060,730 B2 | 6/2006 | Gelotte et al. |
| 7,442,832 B2 | 10/2008 | Gentile et al. |
| 8,362,029 B1 | 1/2013 | Evenstad et al. |
| 8,895,622 B2 | 11/2014 | Kottayil et al. |
| 9,114,068 B2 | 8/2015 | Pavliv et al. |
| 9,351,926 B2 | 5/2016 | Selmi et al. |
| 9,561,195 B2 | 2/2017 | Kottayil et al. |
| 9,566,253 B2 | 2/2017 | Kottayil et al. |
| 2003/0068368 A1 | 4/2003 | Kushla et al. |
| 2007/0117826 A1* | 5/2007 | Janjikhel .............. A61K 31/192 514/282 |
| 2011/0178174 A1 | 7/2011 | Buschmann et al. |
| 2013/0109754 A1 | 5/2013 | Pelaez et al. |
| 2015/0105468 A1 | 4/2015 | Martinez-Alzamora et al. |
| 2015/0290211 A1* | 10/2015 | Bosse ................ A61K 31/4515 514/226.2 |

(Continued)

FOREIGN PATENT DOCUMENTS

| | | |
|---|---|---|
| EP | 0546676 A1 | 6/1993 |
| EP | 1059084 B1 | 12/2000 |
| EP | 1205181 B1 | 5/2002 |

(Continued)

OTHER PUBLICATIONS

Moore, Pain, 2014, 155, 1, 14-21 (Year: 2014).*
Berge Pharmaceutically Salts J Pharm Sci 1977, 66 1-19 (Year: 1977).*
Silvasti Efficacy and side effects of tramadol versus oxycodone for patient-controlled analgesia after maxillofacial surgeryâ Eur. J. Anaesthesiol. Dec. 16, 2006 (Year: 2006).*
De Palma Pharmacological Research 2009 (Year: 2009).*
Santos ChemMedChem 2019 (Year: 2019).*
Abel. Tramadol: an alternative analgesic to traditional opioids and NSAIDs. Journal of Pharmaceutical Care in Pain & Symptom Control, 1995, 3(1), 5-29.

(Continued)

*Primary Examiner* — Yevgeny Valenrod
(74) *Attorney, Agent, or Firm* — Casimir Jones, S.C.; Tristan A. Fuierer

(57) ABSTRACT

The present invention relates to the combination of ibuprofen in the form of a pharmaceutically acceptable salt, and tramadol, or a pharmaceutical acceptable salt thereof, for use in the treatment of pain in humans, wherein the dosage of ibuprofen in the combination is comprised between 350 mg and 450 mg and the dosage of tramadol is comprised between 35 mg and 40 mg, expressed as equivalent weight of tramadol hydrochloride. The combination is suitable for the treatment of moderate to severe pain, of chronic or acute origin, and is particularly effective for those patients suffering from more intense pain. It also relates to a pharmaceutical composition comprising said fixed-dose combination of ibuprofen and tramadol.

20 Claims, 1 Drawing Sheet

(56) References Cited

U.S. PATENT DOCUMENTS

2017/0281534 A1    10/2017    Pavliv

FOREIGN PATENT DOCUMENTS

| | | | |
|---|---|---|---|
| EP | 1439830 | B1 | 7/2004 |
| EP | 1558234 | B1 | 8/2005 |
| EP | 2474309 | A1 | 7/2012 |
| EP | 2636406 | B1 | 9/2013 |
| ES | 435416 | A1 | 12/1976 |
| GB | 971700 | | 9/1964 |
| IN | 2006MU01199 | A | 6/2009 |
| WO | WO 95/00134 | A1 | 1/1995 |
| WO | WO 00/25769 | A1 | 5/2000 |
| WO | WO 2010/105129 | A1 | 9/2010 |
| WO | WO 2011/079213 | A2 | 6/2011 |
| WO | WO 2013/124498 | A1 | 8/2013 |

OTHER PUBLICATIONS

Arthur et al., Safe Opioid Use: Management of Opioid-Related Adverse Effects and Aberrant Behaviors. Hematol Oncol Clin North Am. Jun. 2018;32(3):387-403.

Barkin. Acetaminophen, aspirin, or Ibuprofen in combination analgesic products. Am J Ther. Nov.-Dec. 2001;8(6):433-42.

Bhushan et al., Resolution of enantiomers of ibuprofen by liquid chromatography: a review. Biomed Chromatogr. Nov.-Dec. 1998;12(6):309-16.

Carbonell et al., https://nomenclator.org/tratamiento-oral-para-evaluar-el-dolor-postoperatorio-en-cirugia-dental-con-ibuprofeno.ec, downloaded on Mar. 22, 2018. 10 pages.

El-Sharrawy et al., Attenuation of C-reactive protein increases after exodontia by tramadol and ibuprofen. Anesth Prog. Fall 2006;53(3):78-82.

Gallego-Sandín et al., Effect of ibuprofen on cyclooxygenase and nitric oxide synthase of gastric mucosa: correlation with endoscopic lesions and adverse reactions. Dig Dis Sci. Sep. 2004;49(9):1538-44.

Garlicki et al., Effect of intraarticular tramadol administration in the rat model of knee joint inflammation. Pharmacol Rep. Sep.-Oct. 2006;58(5):672-9.

Grond et al., Clinical pharmacology of tramadol. Clin Pharmacokinet. 2004;43(13):879-923.

Jesse et al., Involvement of L-arginine-nitric oxide-cyclic guanosine monophosphate pathway in the antidepressant-like effect of tramadol in the rat forced swimming test. Prog Neuropsychopharmacol Biol Psychiatry. Dec. 12, 2008;32(8):1838-43.

Jung et al., Onset of analgesia and analgesic efficacy of tramadol/acetaminophen and codeine/acetaminophen/ibuprofen in acute postoperative pain: a single-center, single-dose, randomized, active-controlled, parallel-group study in a dental surgery pain model. Clin Ther. Jul. 2004;26(7):1037-45.

Kolesnikov et al., The synergistic analgesic interactions between hydrocodone and ibuprofen. Anesth Analg. Dec. 2003;97(6):1721-1723.

Lehmann. Tramadol in acute pain. Drugs. 1997;53 Suppl 2:25-33.

Lin et al., Compatibility and stability of binary mixtures of ketorolac tromethamine and tramadol hydrochloride injection concentrate and diluted infusion solution. Acta Anaesthesiol Taiwan. Sep. 2010;48(3):117-21.

Moore et al., Faster, higher, stronger? Evidence for formulation and efficacy for ibuprofen in acute pain. Pain. Jan. 2014;155(1):14-21.

Moroz et al., Use of tramadol hydrochloride in therapeutic operative dentistry: Clinical investigation. Current Therapeutic Research. 1991. 49(3),371-375.

Negro et al., Compatibility and stability of tramadol and dexamethasone in solution and its use in terminally ill patients. J Clin Pharm Ther. Oct. 2007;32(5):441-4.

Perrot et al., GRTF-ZAL-1 Study group. Efficacy and tolerability of paracetamol/tramadol (325 mg/37.5 mg) combination treatment compared with tramadol (50 mg) monotherapy in patients with subacute low back pain: a multicenter, randomized, double-blind, parallel-group, 10-day treatment study, Clinical therapeutics, Excerpta medica, Princeton, NJ, US, col. 28, No. 10, Oct. 2006 (Oct. 2006), pp. 1592-1606.

Planas et al., Non-steroidal anti-inflammatory drugs antagonise the constipating effects of tramadol. Eur J Pharmacol. Dec. 15, 2003;482(1-3):223-6.

Raffa et al., Opioid and nonopioid components independently contribute to the mechanism of action of tramadol, an 'atypical' opioid analgesic. J Pharmacol Exp Ther. Jan. 1992;260(1):275-85.

Schug. The role of tramadol in current treatment strategies for musculoskeletal pain. Ther Clin Risk Manag. Oct. 2007;3(5):717-23.

Suthakaran et al., Evaluation of analgesic and anti-inflammatory activity of a combination of tramadol-ibuprofen in experimental animals. Indian J Dent Res. May-Jun. 2017;28(3):248-251.

Wells et al., Efficacy of Ibuprofen and ibuprofen/acetaminophen on postoperative pain in symptomatic patients with a pulpal diagnosis of necrosis. J Endod. Dec. 2011;37(12):1608-12.

Williams et al., Updating the definition of pain. Pain. Nov. 2016;157(11):2420-2423.

Silvasti, et al. Efficacy and side effects of tramadol versus oxycodone for patient-controlled analgesia after maxillofacial surgery, Eur J Anaesthesiol. 16(12):834-9 (Dec. 1999).

* cited by examiner

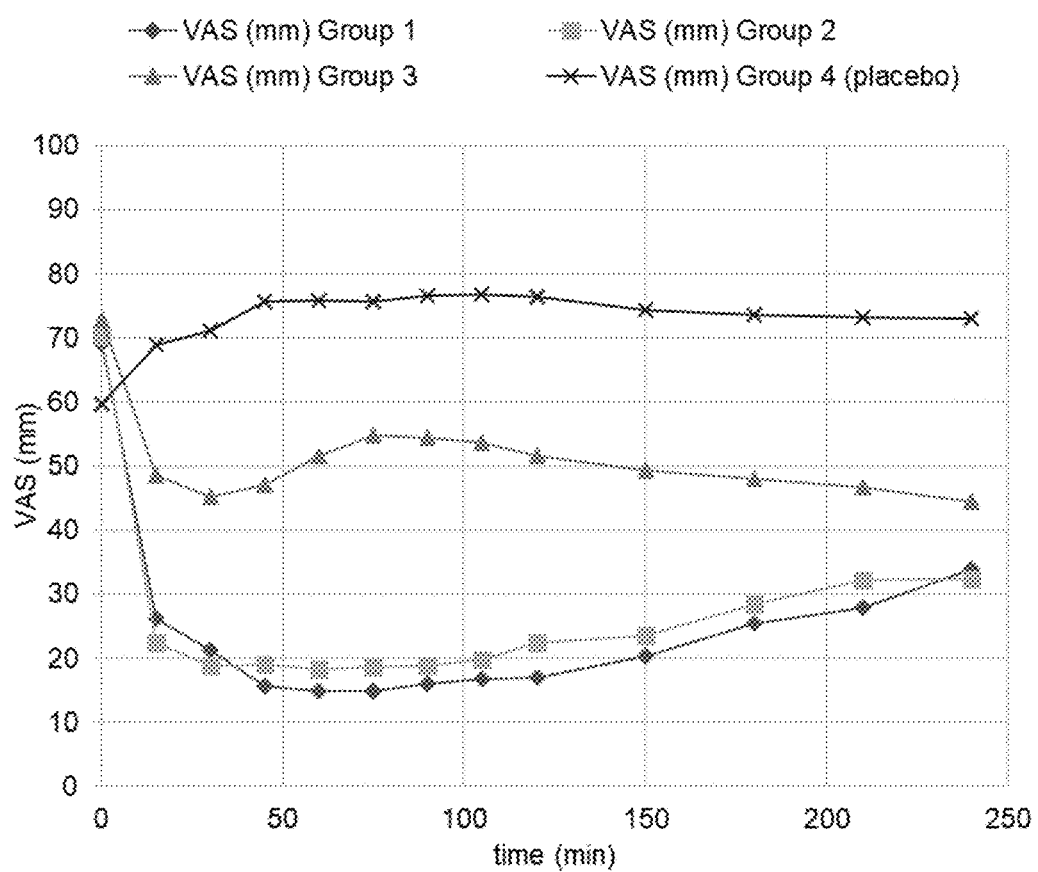

COMBINATION OF IBUPROFEN AND TRAMADOL FOR RELIEVING PAIN

CROSS-REFERENCE TO RELATED APPLICATIONS

This application is filed under the provisions of 35 U.S.C. § 371 and claims the priority of International Patent Application No. PCT/EP2020/069306 filed on 8 Jul. 2020 entitled "COMBINATION OF IBUPROFEN AND TRAMADOL FOR RELIEVING PAIN" in the name of Antonio POR-TOLÉS PÉREZ, et al., which claims priority to European Patent Application No. 19382583.3, filed on 9 Jul. 2019, both of which are hereby incorporated by reference herein in their entirety.

TECHNICAL FIELD

The present invention relates to a new drug combination which is particularly useful for the therapeutic management of moderate to severe pain.

STATE OF THE ART

Pain is a distressing feeling which has profound impact in the patient's quality of life. Pain management is probably one of the most important challenges for the health care professionals and is also one of the main subjects in current medicinal research.

Pain may be defined as a distressing experience associated with actual or potential tissue damage with sensory, emotional, cognitive, and social components (Williams et al., Pain 2016, 157, 2420-23).

The aetiology of pain may be diverse, for example, may be due to injuries or to underlying diseases or conditions, either malignant or non malignant, or may be the consequence of a surgical intervention.

Other classifications of pain distinguish between nociceptive pain, which is a normal bodily response to injury, and neuropathic pain, which arises from a lesion that affects to central or peripheral nervous system. Furthermore, the two main types of nociceptive pain are somatic and visceral pain; somatic pain refers to injuries to the musculoskeletal system, including skin, muscles and bone, while visceral pain, correlates with internal organ tissues and can be felt indirectly. Pain is also often associated with inflammatory response.

In terms of its duration, pain may be classified into acute and chronic pain. Acute pain is generally of short duration, generally up to few weeks, and occurs in response to tissue trauma, and declines with the healing of the underlying injury or disease, so it has a warning function of the potential for or extent of injury. Conversely, chronic pain is that which persists past normal healing time and hence lacks the acute warning function of physiological nociception.

One common cause of acute pain is surgical trauma, and acute post-operative pain is one of the factors responsible of the delay in the recovery of patients undergoing surgery.

Nonsteroidal anti-inflammatory drugs (NSAIDs) are the most commonly prescribed drugs for the treatment of both acute and chronic pain and, amongst them, ibuprofen is probably one of the most widely used analgesic drugs.

It is believed that ibuprofen, like most NSAIDs, exerts its analgesic action by inhibiting the enzyme cyclooxygenase (COX), which is mainly responsible for the synthesis of prostaglandins. Although ibuprofen is safer than other NSAIDs, it can also give rise to some undesirable adverse effects, for example, gastric lesions and gastric bleeding, among others.

Another drawback for the use of NSAIDs as analgesics is that they are sometimes insufficient for the adequate relief of pain of certain intensity.

According to the results of several comparative clinical trials, ibuprofen in the form of salt, for example, with arginine (ibuprofen arginate), lysine (ibuprofen lysinate) or the sodium salt, is advantageous over standard ibuprofen (in acidic form), as it is reported to provide more rapid onset of analgesia and also superior analgesic effect (Moore et al. *Faster, higher, stronger? Evidence for formulation and efficacy for ibuprofen in acute pain.* Pain 2013, 155 (1), 14-21).

Furthermore, ibuprofen arginate has been reported to cause fewer gastric endoscopic lesions and to be associated with significantly lower rate of clinical adverse effects than ibuprofen, which could be explained by the increase in NO synthesis induced by arginine (Gallego-Sandin et al., *Effect of ibuprofen on cyclooxygenase and nitric oxide synthase of gastric mucosa: correlation with endoscopic lesions and adverse reactions*, Dig. Dis. Sci., 2004, 49 (9), 1538-44).

Another class of drugs frequently used for pain management are opioids. The efficacy of opioid analgesics in the management of severe pain is widely recognized.

Tramadol, for example, is a centrally acting analgesic which possesses opioid agonist properties which is frequently used in the treatment of moderate to severe pain, of chronic or acute origin. Its mechanism action is in fact dual, because it acts on the μ opioid receptors to which it binds with low affinity and on the other hand it inhibits the reuptake of noradrenaline and serotonin (J Pharmacol. Exp. Ther., 1992, 260 (1), 275-85).

Despite their superior analgesic efficacy, the administration of opioids for treating pain is related to a number of adverse effects, for example gastrointestinal (e.g., nausea or vomiting), or affecting the central nervous system (e.g., respiratory depression, cognitive impairment, hallucination or allodynia), or the cardiovascular system (e.g., hypotension or bradycardia) or the skin, as well as hormonal or immunologic adverse effects. (Arthur et al, *Safe opioid use. Management of opioid-related adverse effects and aberrant behaviors*, Hematol. Oncol. Clin. N. Am., 2018, 32, 387-403).

Therefore, health practitioners must carefully weigh the risks and the benefits associated to opioids when prescribing them for pain relief. The potential risks associated to opioids are of particular concern in the treatment of pre- and post-operatory pain, wherein effective and safe pain relief is critical.

One way of reducing the risk of adverse effects associated to opioids is to reduce as much as possible the recommended dosage, but such dosage reduction should not be at the expense of the efficacy of the treatment.

One strategy for maximizing the efficacy of analgesic drugs and reducing the adverse effects is the appropriate combination of analgesics with different mechanisms of action. In particular, some combinations of NSAIDs with opioids provide synergistic effect, allowing maximizing the efficacy and reducing the side effects.

In particular, the combination of tramadol with different NSAIDs is reported in the state of the art as an effective strategy for pain management.

The synergism of such combinations allows reducing the amount of tramadol, while maintaining good analgesia.

However, the dose adjustment of each drug in the combination in order to minimize the adverse effects while maintaining the analgesic effect is not a trivial issue. Even if it is desirable minimizing the amount of the opioid tramadol for safety reasons, it is nevertheless important maintaining the maximum analgesic effect.

Several medicinal products are available in the market comprising the combination of tramadol and a NSAID, which take advantage of the synergism of the combination. Thus, for example, Enanplus® and Skudexa® are film-coated tablets comprising the combination of 75 mg of tramadol hydrochloride and 25 mg of dexketoprofen. The recommended dose is one tablet, with a minimum dosing interval of 8 hours.

Further examples of combination medicaments are Tramacet® and Zaldiar® which are film-coated tablets comprising the combination of tramadol hydrochloride and paracetamol. The recommended posology is an initial dosage of two tablets, equivalent to 75 mg of tramadol and 650 mg of paracetamol, with a dosing interval not less than six hours and maximum daily dosage of 300 mg tramadol hydrochloride and 2600 mg paracetamol.

Pharmaceutical compositions comprising fixed-dose combinations of ibuprofen arginate and tramadol hydrochloride are disclosed in the European patent application EP2474309-A1, which are believed to be useful for the treatment pain. In particular, film-coated tablets and oral granules comprising 400 mg of ibuprofen, 75 mg of tramadol hydrochloride and 340 mg of arginine are disclosed.

It is noticeable that in all the medicinal products authorized so far in the European countries comprising tramadol combined with a second analgesic, the minimum dosage of tramadol hydrochloride is 75 mg. Furthermore, in tramadol specialties, the recommended dosage of tramadol hydrochloride is 100 mg, and is never inferior to 50 mg.

Despite the currently available alternatives for pain management, there is still the need of further analgesic medications having good therapeutic efficacy and less adverse effects.

OBJECT OF THE INVENTION

The object of the present invention is a combination of ibuprofen in the form of a pharmaceutically acceptable salt thereof and tramadol, or a pharmaceutically acceptable salt thereof, in specific dosages, for use in the treatment of pain.

Another object of the present invention is a pharmaceutical composition comprising ibuprofen in the form of a pharmaceutically acceptable salt thereof and tramadol, or a pharmaceutical salt thereof, in specific dosages, and at least one pharmaceutically acceptable excipient.

DESCRIPTION OF THE DRAWINGS

FIG. 1 represents the evolution of Pain Intensity, measured with the Visual Analogue Scale (VAS) in the range 0 to 100 mm (or 0 to 10 cm), according to the results of the comparative clinical trial described in Example 1, where patients suffering from moderate to severe pain after dental surgery were treated intravenously with the combination of 37.5 mg of tramadol HCl and 400 mg of ibuprofen (as ibuprofen arginate) (Group 1), or with the combination of 75 mg of tramadol HCl and 400 mg of ibuprofen (as ibuprofen arginate) (Group 2), or with 100 mg of tramadol HCl (Group 3) or with placebo (Group 4). The VAS values represented in the graph are the average values for each group. Time point 0 represents the starting point, when treatment was administered to the patients.

DETAILED DESCRIPTION OF THE INVENTION

The object of the present invention is a combination of ibuprofen in the form of a pharmaceutically acceptable salt thereof and tramadol or a pharmaceutical acceptable salt thereof, for use in the treatment of pain in humans, characterized in that the dosage of ibuprofen in the combination is comprised between 350 mg and 450 mg and the dosage of tramadol or a pharmaceutically acceptable salt thereof in the combination is comprised between 35 mg and 40 mg, expressed as equivalent weight of tramadol hydrochloride.

The authors of the present invention have developed a specific combination of ibuprofen and tramadol wherein the synergistic analgesic effect of both drugs is maximized. Surprisingly, the analgesic effect of such combination, using a remarkable low dose of tramadol, so far considered subtherapeutic, is even more effective than that achieved with the combination of ibuprofen with higher doses of tramadol. That finding is particularly relevant and unexpected, and it allows simultaneously increasing the analgesic effect and reducing the potential adverse effects associated to the use of tramadol at the doses commonly employed in clinical practice.

The object of the present invention may also be defined as a method of treating pain in a human subject in need thereof comprising administering to said subject a combination of ibuprofen in the form of a pharmaceutically acceptable salt thereof and tramadol, or a pharmaceutical acceptable salt thereof, wherein the dosage of ibuprofen in the combination is comprised between 350 mg and 450 mg and the dosage of tramadol or a pharmaceutically acceptable salt thereof in the combination is comprised between 35 mg and 40 mg, expressed as equivalent weight of tramadol hydrochloride.

Along the present description, as well as in the claims, the singular expressions, generally preceded by the articles "a", "an" or "the", are meant to include also the plural forms, unless the context clearly indicates otherwise. Furthermore, numeric values preceded by the term "about" are meant to include a certain variation around such value, namely a variation or ±2% of the stated amount. Numeric ranges defined by lower and upper endpoints are meant to include also said stated endpoints.

Tramadol

Tramadol is the International Nonproprietary Name (INN) for the substance (±)-cis-2-[(dimethylamino)methyl]-1-(3-methoxyphenyl) cyclohexanol.

Tramadol is a centrally acting analgesic compound with multimodal mechanism of action, as it acts as agonist of μ-opioid receptors and as serotonin (5-HT) and noradrenaline (NE) reuptake inhibitor. Furthermore, its metabolite O-desmethyltramadol has also activity on the μ-opioid receptor.

The molecule of tramadol has two chiral centres, so it may exist in four different stereoisomeric forms, corresponding to two pair of enantiomers, namely (1R,2R) and (1S,2S) (the cis forms), and (1R,2S) and (1S,2R) (the trans forms).

Within the scope of the present invention, the term tramadol includes any of the cis-forms, including any stereoisomer, mixtures of stereoisomers in any proportion and, in particular, the racemate, i.e., the racemic (1:1) mixture of the (1R,2R) and the (1S,2S) stereoisomers.

Tramadol is a basic compound, containing an amine group. The pharmaceutically acceptable salts of tramadol include its acid addition salts, including any solvate and crystalline forms thereof.

The pharmaceutically acceptable addition salts of tramadol may be prepared by conventional methods that are well-known to the skilled in the art, using pharmaceutically acceptable, substantially non-toxic organic or inorganic acids. Suitable acids include hydrochloric, nitric, sulphuric, phosphoric, acetic, propionic, maleic, malonic, succinic, citric, tartaric, malic, salicylic and phthalic acids, among others. Preferably, hydrochloric acid is used.

In a preferred embodiment tramadol is in the form of the hydrochloride salt.

In a particularly preferred embodiment, tramadol is in the form of the hydrochloride salt of racemic tramadol.

Tramadol is commercially available from several sources and may also be prepared following the process disclosed in U.S. Pat. No. 3,652,589.

Along the present description, as well as in the claims, the stated amounts of tramadol or a pharmaceutically acceptable salt thereof are always expressed as the equivalent weight of tramadol hydrochloride, even if tramadol is used as the free base or in the form of other salts. For example, 32.9 mg of tramadol free base are 37.5 mg when expressed as equivalent weight of tramadol hydrochloride.

Ibuprofen

Ibuprofen is the International Nonproprietary Name (INN) for the compound (RS)-2-(4-(2-methylpropyl)phenyl)propanoic acid.

Ibuprofen is a drug belonging to the group of non-steroidal anti-inflammatories (NSAIDs) that has analgesic, anti-pyretic and anti-inflammatory properties.

The molecule of ibuprofen has one chiral centre, so it may exist in two enantiomeric forms. Within the scope of the present invention, the term ibuprofen includes ibuprofen in its racemic form ((R,S)-ibuprofen), the (S) enantiomer of ibuprofen ((S)-ibuprofen) and a mixture of the (R) and (S) enantiomers of ibuprofen in any proportion, preferably enriched in the form (S). Preferably, the ibuprofen used in the present invention is selected from (R,S)-ibuprofen and (S)-ibuprofen. More preferably, is racemic (R,S)-ibuprofen.

Ibuprofen is commercially available and can also be prepared, for example, according to the procedure described in the British patent application GB-A-971700. The resolution of ibuprofen in its enantiomers is described, for example, in the article Brushan et al. *Resolution of enantiomers of ibuprofen by liquid chromatography: a review*, Biomed. Chromatogr., 1998, 12 (6), 309.

Ibuprofen is an acidic molecule, comprising a carboxylic acid moiety. In the present invention, ibuprofen is used in the form of a pharmaceutically acceptable salt thereof.

In an embodiment of the invention, the pharmaceutically acceptable salt of ibuprofen is selected from the salt with arginine (ibuprofen arginate), the salt with lysine (ibuprofen lysinate) and ibuprofen sodium.

In another embodiment of the invention, the pharmaceutically acceptable salt of ibuprofen is selected from ibuprofen arginate and ibuprofen lysinate.

In a preferred embodiment of the invention, ibuprofen is in the form of salt with arginine (ibuprofen arginate).

When ibuprofen is in the form of salt with arginine, the pharmaceutical compositions according to the present invention, can be prepared either using the previously formed salt of ibuprofen arginate, in a conventional way, or using ibuprofen and arginine independently, as separate ingredients of the composition. The latter option allows that ibuprofen and arginine are not in a fixed 1:1 stoichiometric molar ratio as would occur in the case of using the previously prepared salt.

Thus, within the context of the present invention, the terms ibuprofen arginate, or ibuprofen in the form of salt with arginine, are used to indicate that ibuprofen is administered together with arginine, in any molar ratio. Generally, the molar ratio ibuprofen:arginine is comprised between 1.2:1 and 1:1.2, preferably comprised between 1:1 and 1:1.2, and still more preferably comprised between 1:1.05 and 1:1.1.

When ibuprofen arginate is used in the form of the previously formed salt (thus, with a molar ratio of 1:1), said salt can be prepared, for example, as described in the Spanish patent application ES435416.

Arginine, on the other hand, is an α-amino acid, which is found in nature in its enantiomeric form L. In the context of this invention, the term arginine includes any of its enantiomeric forms: L-arginine, D-arginine and mixtures thereof. Preferably, arginine is in the form of L-arginine.

Arginine can be obtained commercially from various sources.

In another embodiment of the invention, ibuprofen is in the form of salt with lysine (ibuprofen lysinate).

When ibuprofen is in the form of salt with lysine, the pharmaceutical compositions according to the present invention can be prepared either using the previously formed salt of ibuprofen lysinate, in a conventional way, or using ibuprofen and lysine independently, as separate ingredients of the composition. The latter option allows that ibuprofen and lysine are not in a fixed 1:1 stoichiometric molar ratio as would occur in the case of using the previously prepared salt.

Thus, within the context of the present invention, the terms ibuprofen lysinate, or ibuprofen in the form of salt with lysine, are used to indicate that ibuprofen is administered together with lysine, in any molar ratio. Generally, the molar ratio ibuprofen:lysine is comprised between 1.2:1 and 1:1.2, preferably comprised between 1.1:1 and 1:1.1, and still more preferably is about 1:1.

When ibuprofen lysinate is used in the form of the previously formed salt (thus, with a molar ratio of 1:1), said salt can be prepared, for example, as described in the Spanish patent application ES435416.

Lysine is an α-amino acid, which is found in nature in its enantiomeric form L. In the context of this invention, the term lysine includes any of its enantiomeric forms: L-lysine, D-lysine and mixtures thereof. Preferably, lysine is in the form of L-lysine.

Lysine can also be obtained commercially from various sources.

Along the present description, as well as in the claims, the stated amounts of ibuprofen salt are always expressed as the weight of ibuprofen free acid. For example, 737.8 mg of ibuprofen arginate (1:1 molar ratio) correspond to 400.0 mg of ibuprofen free acid.

Combination Treatment

The therapeutic use according to the present invention is based on the outstanding analgesic effects of the combination of ibuprofen in the form of a pharmaceutically acceptable salt thereof and tramadol, or a pharmaceutically acceptable salt thereof, wherein:

the dosage of ibuprofen in the combination is comprised between 350 mg and 450 mg, preferably comprised between 360 mg and 440 mg, more preferably comprised between 370 mg and 430 mg, still more preferably comprised between 380 mg and 420 mg, still more preferably comprised between 390 mg and 410 mg, still more preferably the dose is about 400 mg and still more preferably is 400 mg;

the dosage of tramadol or a pharmaceutically acceptable salt thereof in the combination, expressed as equivalent weight of tramadol hydrochloride, is comprised between 35 mg and 40 mg, preferably comprised between 36 mg and 39 mg, more preferably is about 37.5 mg, and still more preferably is 37.5 mg;
and wherein the ibuprofen salt is preferably selected from ibuprofen arginate, ibuprofen lysinate and ibuprofen sodium, more preferably is selected from ibuprofen arginate and ibuprofen lysinate, still more preferably is ibuprofen arginate, and still more preferably is ibuprofen arginate wherein the amount of arginine is such that the molar ratio ibuprofen:arginine is comprised between 1.2:1 and 1:1.2, more preferably comprised between 1:1 and 1:1.2, and still more preferably comprised between 1:1.05 and 1:1.1.

The term "dose" or "dosage" as used in the present description, as well as in the claims, means the therapeutically effective amount (weight) of the two drugs in the drug combination which is administered to the patient in a single administration.

Such dose or dosage may be repeated, one or more times, depending on the therapeutic needs, and/or according to the medical prescription in each particular case. When repeated doses are administered, the time interval between doses is generally comprised between about 4 hours and about 8 hours; for example, the time interval between doses may be about 4 hours, or about 6 hours, or about 8 hours. Other even less frequent schedules of administration, i.e., with longer time intervals between doses, are also included within the scope of the present invention, so the dosage can be tailored to meet the specific therapeutic requirements, according to the intensity and duration of the pain.

The duration of the treatment using the combination according to the present invention can widely vary, depending on the type and the persistence of the pain being treated, and it can be easily adjusted by the medical practitioner for each particular situation, as is common practice in the field. Generally, the duration of the treatment can vary from a single administration, to repeated administrations along several days, e.g., 1, 2, 3, 4, 5, 6 or 7 days, for example, or up to several weeks, or several months.

Each dosage of the combination according to the present invention may be administered either in a preferred unique pharmaceutical composition comprising a fixed-dose combination of both drugs, i.e., ibuprofen in the form of an acceptable salt thereof and tramadol or a pharmaceutically acceptable salt thereof; or, alternatively, both drugs may be administered concomitantly but using two independent pharmaceutical dosage forms, i.e., one for ibuprofen in the form of a pharmaceutically acceptable salt thereof and one for tramadol or a pharmaceutically acceptable salt thereof. Concomitant administration means either substantially simultaneous administration or consecutive administration with a short time interval, e.g. generally of less than 5 minutes.

The use of a fixed-dose combination in a single administration is generally preferred because the administration is easier, thus facilitating drug compliance and enhancing drug safety.

The combination according to the present invention may be administered by any suitable administration form, namely by the oral route or by intravenous injection.

In a preferred embodiment of the invention, the combination is administered by the oral route.

In another preferred embodiment of the invention, the combination is administered intravenously.

In another embodiment of the invention, ibuprofen in the form of a pharmaceutically acceptable salt thereof is administered orally and tramadol or a pharmaceutically acceptable salt thereof is administered intravenously.

In another embodiment of the invention, ibuprofen in the form of a pharmaceutically acceptable salt thereof is administered intravenously and tramadol or a pharmaceutically acceptable salt thereof is administered orally.

The combination according to the present invention is intended for the treatment of pain. In this context, the expression treatment of pain has the usual meaning in the medical field, i.e., it includes either eliminating the feeling of pain, or reducing pain intensity, or preventing a foreseeable pain to appear.

The treatment of pain according to the present invention refers to the treatment of a subject suffering from pain or prone to suffer from pain, wherein the term "subject" relates to human beings.

As pain is a subjective experience, it is not possible to measure pain intensity in a completely objective way and, therefore, patient self-reported measures are commonly used for measuring pain intensity. Among the rating scales available for measuring pain intensity are the visual analogue scale (VAS), numeric rating scale (NRS) and verbal rating scale (VRS), for example, as disclosed in the *Guideline on the clinical development of medicinal products intended for the treatment of pain* (EMA/CHMP/970057/2011).

In particular, the visual analogue scale (VAS) can be used for measuring pain intensity. It is a continuous variable on a 10 cm (or 100 mm) line representing from "no pain" (0 mm), as one end-point, to "worst imaginable pain" (100 mm), as the other end-point.

Example 1 shows the results of a comparative clinical trial in patients suffering from moderate to intense pain after dental surgery, namely, after surgical extraction of at least two third molars, at least one of them inferior, and at least one of them impacted, involving bone removal, which is a well-recognized model of moderate to severe acute pain as disclosed in the guideline EMA/CHMP/970057/2011.

It is remarkable that, although the VAS cut-off value for including patients in the trial was 55 mm, the basal VAS value at time 0, before starting the treatment, was about 70 mm for all groups, i.e. the patients undergoing the assay were suffering from particularly severe pain.

As disclosed in Example 1, it was surprisingly found that pain relief was superior in the patients treated with the combination ibuprofen arginate/tramadol HCl 400/37.5 mg (Group 1) than those treated with an analogous combination which contained twice the amount of tramadol, i.e. 400/75 mg (Group 2) (See FIG. 1). Indeed, it was completely surprising and unexpected that the combination ibuprofen arginate/tramadol HCl 400/37.5 mg provided better pain relief than the combination ibuprofen arginate/tramadol HCl 400/75 mg.

It is also particularly remarkable that the pain relief achieved with the combination of the present invention (400/37.5 mg ibuprofen/tramadol, Group 1) is far superior the relief obtained using a much higher dose of tramadol alone (100 mg tramadol HCl, Group 3), which is one of the current standard strategies for the management of acute severe pain.

Although there is no a clear-cut boundary between acute and chronic pain, acute pain is considered adaptive, in that it has a warning function, and is of short duration (generally up to a few weeks) and declines with the healing of the underlying injury or disease (e.g. post-surgical pain).

On the other hand, chronic pain can be defined as pain that persists past normal healing time and hence lacks the acute warning function. Usually pain is regarded as chronic when it lasts or recurs for more than 3 to 6 months.

The combination according to the present invention is suitable for the treatment of virtually any type of pain, including chronic and acute pain, preferably of moderate to severe intensity.

In one embodiment, the combination according to the present invention is for use in the treatment of chronic pain.

In another preferred embodiment, the combination according to the present invention is for use in the treatment of acute pain.

As disclosed above when discussing the results of Example 1, the combination according to the present invention is particularly effective for the relief of severe pain (which is generally defined as that with VAS value of about 7 or higher). Therefore, in one embodiment, the combination according to the present invention is for use in the treatment of severe pain.

The pain to be treated with the combination according to the present invention may be located in any part or region of the body and may have any aetiology, namely, may be due to any underlying disease or condition, or to an injury or may due as the result of a medical treatment, including surgical interventions. The pain may be either nociceptive (somatic or visceral) or neuropathic.

In one embodiment, the combination of the invention is for the treatment of nociceptive pain.

In particular, effective postoperative pain control is essential in any surgical procedure and inadequate pain control may result in increased mortality, delayed recovery and increased hospital costs.

Therefore, in one embodiment, the combination according to the present invention is for use in the treatment of acute post-operative pain.

The analgesic combination treatment of the present invention is generally addressed to adults, as shown in the enclosed examples. Therefore, in one embodiment, the combination according to the present invention is for use in adults, including young adults, i.e. for patients aged 12 or older. In another particular embodiment, the combination according to the present invention is for use in adult patients aged 18 or older.

Pharmaceutical Dosage Forms

According to one embodiment of the invention, independent dosage forms are prepared for each active ingredient, i.e., for ibuprofen in the form of a pharmaceutically acceptable salt thereof and for tramadol or a pharmaceutically acceptable salt thereof, and they are used in combination, by administering them jointly or consecutively, in the appropriate doses according to the present invention.

According to another embodiment of the present invention, both drugs are administered in the form of a fixed-dose combination. A fixed-dose combination typically means a single pharmaceutical composition comprising the combination of both active ingredients and at least one pharmaceutically acceptable excipient. The term "fixed-dose combination" means that the proportion of both ingredients cannot be altered since they are inseparably, formulated together in the composition.

Therefore, another aspect of the present invention is a pharmaceutical composition comprising ibuprofen in the form of a pharmaceutically acceptable salt thereof and tramadol, or a pharmaceutically acceptable salt thereof, and at least one pharmaceutically acceptable excipient, wherein:

the amount of ibuprofen is comprised between 350 mg and 450 mg, preferably comprised between 360 mg and 440 mg, more preferably comprised between 370 mg and 430 mg, still more preferably comprised between 380 mg and 420 mg, still more preferably comprised between 390 mg and 410 mg, still more preferably the amount of ibuprofen is about 400 mg and still more preferably is 400 mg;

the amount of tramadol or a pharmaceutically acceptable salt thereof, expressed as equivalent amount of tramadol hydrochloride, is comprised between 35 mg and 40 mg, preferably comprised between 36 mg and 39 mg, more preferably is about 37.5 mg, and still more preferably is 37.5 mg;

and wherein the ibuprofen salt is preferably selected from ibuprofen arginate, ibuprofen lysinate and ibuprofen sodium, more preferably is selected from ibuprofen arginate and ibuprofen lysinate, still more preferably is ibuprofen arginate, and still more preferably is ibuprofen arginate wherein arginine is in an amount corresponding to a molar ratio ibuprofen:arginine comprised between 1.2:1 and 1:1.2, more preferably comprised between 1:1 and 1:1.2, and still more preferably comprised between 1:1.05 and 1:1.1.

Preferably, the pharmaceutical composition consists of ibuprofen in the form of a pharmaceutically acceptable salt thereof, tramadol or a pharmaceutically acceptable salt thereof, in the amounts and preferred forms disclosed above, and at least one pharmaceutically acceptable excipient. I.e., the composition does not contain any further active ingredient.

Another aspect of the invention is said fixed-dose combination composition for use in the treatment of pain.

According to one embodiment, the fixed-dose combination according to the invention is an oral pharmaceutical dosage form.

Suitable pharmaceutical forms for oral administration are solid pharmaceutical forms, including tablets, capsules, granules, powders and pills; as well as liquid pharmaceutical forms, including solutions, syrups and suspensions.

Preferably, the oral composition is selected from the group consisting of powders or granules for oral solution, oral solutions, capsules and tablets.

According to another embodiment, the fixed-dose combination according to the invention is an injectable dosage form, which is suitable for intravenous administration.

These pharmaceutical compositions may be prepared by conventional procedures, well-known to the skilled in pharmaceutical technology, as disclosed in reference books in the field, for example, in the book *Aulton's Pharmaceutics. The design and manufacture of medicines*, M. E. Aulton and K. M. G. Taylor, editors, Churchill Livingstone Elsevier, Fourth Edition, 2013; or in the book *Remington Essentials of Pharmaceutics*, L. Felton, editor, Pharmaceutical Press, 2013; or in the book *Pharmaceutics. Basic principles and application to pharmacy practice*. A. K. Dash, S. Singh, and J. Tolman, editors, Academic Press, Elsevier, 2014.

The dosage forms comprise the active ingredients and at least one pharmaceutically active excipient.

Suitable excipients for use in the preparation of pharmaceutical dosage forms are described, for example, in the book *Handbook of pharmaceutical excipients*, R. C. Rowe, P. J. Sheskey and M. E. Quinn, editors, Pharmaceutical Press, sixth edition, 2009.

In one embodiment, the fixed-dose combination according to the invention is an oral pharmaceutical dosage form selected from tablets, capsules and granules or powders.

Common excipients used for the formulation of solid dosage forms, as is well-known in the art, include diluents (also known as fillers or bulking agents), binding agents, lubricants, glidants, anticaking agents, alkalinizing agents, disintegrants and wetting agents, for example. Other additional excipients include sweeteners, flavours, and colorants.

The preparation of solid formulations generally comprises a granulation step, either by wet methods involving a liquid in the process, or by dry methods in which no liquid is used. Powders and granulates may be themselves a pharmaceutical dosage form, which may be filled into sachets and ingested, typically previously dissolved or dispersed in a liquid. Or the powders and granulates may be compressed into tablets or filled into capsules.

The preparation of oral formulations comprising fixed-dose combinations of ibuprofen arginate and tramadol or a pharmaceutically salt thereof, is disclosed in the European patent application EP2474309-A1.

A particularly preferred dosage form is a fixed-dose combination for oral administration selected from granules, powders, tablets and capsules, comprising between 350 mg and 450 mg, preferably between 360 mg and 440 mg, more preferably between 370 mg and 430 mg, still more preferably between 380 mg and 420 mg, still more preferably between 390 mg and 410 mg, still more preferably about 400 mg and still more preferably 400 mg of ibuprofen; between 35 mg and 40 mg, preferably between 36 mg and 39 mg, more preferably about 37.5 mg, and still more preferably 37.5 mg of tramadol or a pharmaceutically acceptable salt thereof, preferably tramadol hydrochloride, expressed as equivalent amount of tramadol hydrochloride; arginine in an amount so that the molar ratio ibuprofen:arginine is comprised between 1.2:1 and 1:1.2, more preferably comprised between 1:1 and 1:1.2, and still more preferably comprised between 1:1.05 and 1:1.1; and at least one pharmaceutically acceptable excipient.

In a preferred embodiment, the composition for oral administration comprises about 37.5 mg of tramadol hydrochloride, about 400 mg of ibuprofen, arginine in an amount so that the molar ratio ibuprofen arginine is comprised in the range 1.2:1 and 1:1.2, and at least one pharmaceutically acceptable excipient, wherein the pharmaceutical composition is selected from granules, powders, tablets and capsules.

Preferably the oral composition consists of said fixed-dose combination of ibuprofen, arginine and tramadol, or a pharmaceutically acceptable salt thereof, and at least one pharmaceutically acceptable excipient, i.e., the composition does not comprise any further active ingredient.

In a preferred embodiment, the formulation is a powder or granulate.

In a preferred embodiment, the formulation is a tablet.

In a preferred embodiment, the formulation is a capsule.

In another embodiment, the fixed-dose combination according to the invention is an intravenous injectable composition. Typically, the intravenous injectable composition is an aqueous solution comprising both active ingredients. Other common ingredients of the intravenous injectable composition are pH regulators, tonicity agents and preservatives, for example, as are well-known in the art.

Said intravenous injectable compositions are typically prepared by dissolving the active ingredients and the optional additional excipients in water for injection. The solution is typically sterilized, for example by filtration and/or autoclaving, and filled into appropriate containers.

The preparation of intravenous injectable compositions comprising ibuprofen arginate and tramadol, or a pharmaceutically acceptable salt thereof, is disclosed in the international patent application WO2013/124498-A1.

A particularly preferred dosage form is a fixed-dose combination in the form of aqueous solution for intravenous injection, comprising between 350 mg and 450 mg, preferably between 360 mg and 440 mg, more preferably between 370 mg and 430 mg, still more preferably between 380 mg and 420 mg, still more preferably between 390 mg and 410 mg, still more preferably about 400 mg and still more preferably 400 mg of ibuprofen; between 35 mg and 40 mg, preferably between 36 mg and 39 mg, more preferably about 37.5 mg, and still more preferably 37.5 mg of tramadol or a pharmaceutically acceptable salt thereof, preferably tramadol hydrochloride, expressed as equivalent amount of tramadol hydrochloride; arginine in an amount so that the molar ratio ibuprofen:arginine is comprised between 1.2:1 and 1:1.2, more preferably comprised between 1:1 and 1:1.2, and still more preferably comprised between 1:1.05 and 1:1.1; and at least one pharmaceutically acceptable excipient.

In a preferred embodiment, the composition is an aqueous solution for intravenous injection comprising about 37.5 mg of tramadol hydrochloride, about 400 mg of ibuprofen, arginine in an amount so that the molar ratio ibuprofen:arginine is comprised between 1.2:1 and 1:1.2, and at last one pharmaceutically acceptable excipient.

Preferably the intravenous injectable composition consists of said fixed-dose combination of ibuprofen, arginine and tramadol, or a pharmaceutically acceptable salt thereof, and at least one pharmaceutically acceptable excipient, i.e., the composition does not comprise any further active ingredient.

EXAMPLES

Example 1 Comparative Clinical Trial to Assess the Efficacy of Intravenous Ibuprofen Arginate Combined with Different Doses of Tramadol in Patients with Moderate to Intense Pain after Dental Surgery A phase III, multicentre, randomized, double-blind, placebo-controlled, pilot study was performed to assess the compared efficacy and safety of intravenous ibuprofen arginate (400 mg) combined with two different doses of tramadol hydrochloride (37.5 and 75 mg) and of intravenous tramadol 100 mg in patients suffering from moderate to intense pain after dental surgery.

Pain intensity was assessed using the Visual Analogue Scale (VAS).

The patients were divided in four groups, receiving the following medication:
  Group 1: ibuprofen arginate/tramadol HCl 400 mg/37.5 mg (16 patients)
  Group 2: ibuprofen arginate/tramadol HCl 400 mg/75 mg (18 patients)
  Group 3: tramadol HCl 100 mg (18 patients)
  Group 4: placebo (saline solution) (17 patients)

The amount of ibuprofen arginate (400 mg) is expressed as the amount of ibuprofen in acidic form. The amount of L-arginine in each composition in groups 1 and 2 was 356 mg, which corresponds to a molar ratio ibuprofen:arginine 1:1.054.

The compositions of groups 1 to 3 were aqueous solutions of the drugs prepared with water for injection. Other excipients included in the compositions were sodium chloride, used as tonicity agent, to reach an osmolality of 310-360 mOsm/Kg, and hydrochloric acid and sodium hydroxide to adjust the pH of the solution to a value in the range 6.8-7.8. The volume of the composition in all groups was 100 ml, which was infused intravenously during 30 minutes, in a single administration. The preparation of the composition used for Group 1 is analogous as disclosed in Example 5. The preparation of the composition used for Group 2 was equivalent, but using 75 mg of tramadol HCl instead of 37.5 mg.

The patients selected for the study were subjects aged 18 years or more, with body weights comprised between 50 and 110 Kg and suffering from moderate to severe pain (VAS cut-off value 0-100≥55 mm) after surgical extraction of at least two third molars, at least one of them inferior, and at least one of them impacted, involving bone removal.

Thus, after the dental surgery, the pain intensity of each patient was evaluated according to the VAS test until reaching the value ≥55 mm. At that moment, the patient was assigned to one of the four groups in a randomized way and the corresponding medication was administered not later than 15 minutes after randomization and not later than 25 minutes after VAS test. A new VAS test was performed at the beginning of the infusion, which was taken as the basal value. If a patient did not reach the required pain intensity after 4 hours from the surgery, it was considered a recruitment failure.

It is noticeable that, although the cut-off VAS value was 55 mm, in the practice, except in the placebo group, all the treated patients showed much higher VAS basal value, from about 70 mm.

After the administration of each medication, the evolution of patients was followed during 4 hours, by assessing the change in pain intensity.

Until 4 hours after the administration of the study medication, the patients did not take any other analgesic, except those defined as rescue medication according to the protocol.

Patients were allowed to ask for rescue medication during that period, starting 30 minutes after the administration of each treatment. Rescue medication was 1 g paracetamol given by the oral route. If a second rescue medication was necessary, a capsule of 575 mg metamizole was administered. If rescue medication was administered before 4 hours after the administration of the study medication, the patient left the study (but remained still included for assessing safety parameters and was under monitoring for further 4 hours).

Pain intensity was assessed for each patient at the following time points: 0 (basal), 15, 30, 45, 60, 75, 90, 105, 120, 150, 180, 210, and 240 minutes after the administration of the medication. For each of the four groups, the average VAS value was calculated.

The results are shown in Table 1 below and are represented graphically in FIG. 1.

TABLE 1

| | VAS (average value) | | | |
|---|---|---|---|---|
| Time (min) | Group 1 N = 16 | Group 2 N = 18 | Group 3 N = 18 | Group 4 N = 17 |
| 0 | 69.00 | 70.17 | 72.83 | 59.71 |
| 15 | 26.19 | 22.5 | 48.55 | 68.94 |
| 30 | 21.37 | 18.89 | 45.28 | 71.12 |
| 45 | 15.62 | 19.11 | 47.11 | 75.76 |
| 60 | 15.00 | 18.33 | 51.67 | 75.82 |
| 75 | 14.87 | 18.72 | 54.72 | 75.76 |
| 90 | 16.00 | 18.89 | 54.44 | 76.65 |
| 105 | 16.75 | 19.83 | 53.67 | 76.88 |
| 120 | 16.94 | 22.5 | 51.55 | 76.41 |
| 150 | 20.31 | 23.55 | 49.39 | 74.35 |
| 180 | 25.44 | 28.39 | 47.94 | 73.53 |
| 210 | 27.94 | 32.28 | 46.72 | 73.29 |
| 240 | 33.94 | 32.50 | 44.50 | 73.00 |

Surprisingly, it was found that pain relief was superior in the patients of Group 1 than in the patients of Group 2, even though the dosage of tramadol administered in Group 1 was significantly smaller, namely the half, than in Group 2 (37.5 mg in Group 1 vs. 75 mg in Group 2).

These results were surprising, because it was completely unexpected that the combination ibuprofen arginate/tramadol HCl 400/37.5 mg provided better pain relief than the combination ibuprofen arginate/tramadol HCl 400/75 mg with double dose of tramadol.

It was also surprisingly found that pain relief in the patients of Group 1 was also notably superior than in the patients of Group 3, even though the dose of the opioid tramadol was remarkably inferior (37.5 mg vs. 100 mg).

The number of patients of each group that needed rescue medication and the number of patients reporting adverse effects (AE) are shown in Table 2.

TABLE 2

| | Group-1 N = 16 | Group-2 N = 18 | Group-3 N = 18 | Group-4 N = 17 |
|---|---|---|---|---|
| Number of rescued patients | 2 | 4 | 9 | 16 |
| % of rescued patients | 12.5% | 22.2% | 50.0% | 94.1% |
| Average time until rescue | 180 min | 187.5 min | 70 min | 74 min |
| Number of patients reporting AE | 2 | 7 | 5 | 1 |
| % of patients reporting AE | 12.5% | 38.9% | 27.8% | 5.9% |
| Number of AE | 5 | 10 | 9 | 1 |

It is remarkable that the percentage of rescued patients in Group 1 is lower than in Groups 2, 3 and 4, thus further confirming that the combination of the invention provides a particularly effective pain relief.

Furthermore, the percentage of patients reporting adverse effects is also lower in Group 1, confirming that it is the safest therapy.

In summary, the results show that the combination ibuprofen arginine/tramadol HCl 400/37.5 mg, according to the present invention, administered intravenously, is effective for the treatment of moderate to severe acute postoperative pain and that such combination is surprisingly more effective compared to the combination ibuprofen arginine/tramadol HCl 400/75 mg, despite containing half the amount of tramadol, and also is remarkably more effective than using a much higher dose (100 mg) of tramadol HCl alone.

Furthermore, the combination of the invention provides not only the best option in terms of efficacy, but also in terms of safety.

Example 2 Comparative Clinical Trial to Assess the Efficacy of Oral Ibuprofen Arginate/Tramadol (400/37.5) in Patients with Moderate to Intense Pain after Dental Surgery A phase III, multicentre, randomized, double-blind, placebo-controlled study was performed to assess the compared efficacy and safety of the combination of ibuprofen arginate/tramadol HCl (400 mg ibuprofen/37.5 mg tramadol HCl) administered by the oral route, compared to oral tramadol (50 mg), oral ibuprofen arginate (400 mg ibuprofen) and placebo for treating adult patients (aged 18 or more) suffering from moderate to intense somatic pain after dental surgery.

Pain intensity was assessed using the Visual Analogue Scale (VAS).

The patients selected for the study were adults suffering from moderate to severe pain (VAS 0-100≥45 mm) after surgical extraction of at least two third molars, if only two third molars were extracted, they should be ipsilateral and at least one of them impacted, involving bone removal.

The patients were divided in four groups, receiving the following medication:
  Group 1: ibuprofen arginate/tramadol HCl 400 mg/37.5 mg (95 patients)
  Group 2: ibuprofen arginate 400 mg (97 patients)
  Group 3: tramadol HCl 50 mg (98 patients)
  Group 4: placebo (93 patients)

The amount of ibuprofen arginate (400 mg) is expressed as the amount of ibuprofen in acidic form.

The combination of ibuprofen arginate/tramadol HCl administered to the patients of Group 1 was in the form of a granulate for oral administration (as described in Example 4). Each dosage comprised 340 mg of L-arginine.

The ibuprofen arginate 400 mg administered to the patients of Group 2 corresponded to the commercial medicine Espidifen® 400 mg, each dose comprising 400 mg of ibuprofen, given as 770 mg of ibuprofen arginate.

The 50 mg dose of tramadol HCl 50 mg of Group 3 was administered using the commercial medicine Adolonta® 100 mg/ml oral solution.

After the dental surgery, the pain intensity of each patient was evaluated according to the VAS test until reaching the value ≥45 mm. At that moment, the patient was assigned to one of the four groups in a randomized way and the corresponding medication was administered. A new VAS test was performed after the administration of the first dose of the medication, which was taken as the basal value. 4 doses of each medication were administered, with an interval of 6 hours between doses.

After the administration of each medication, the evolution of patients was followed until 24 hours after the first dosage, by assessing the change in pain intensity.

Patients were allowed to ask for rescue medication during that period, starting 30 minutes after the administration of the first dosage. Rescue medication was 1 g paracetamol given by the oral route. If a second rescue medication was necessary, a capsule of 575 mg metamizole was administered.

Pain intensity was assessed for each patient at the following time points: 0 (basal), 1, 2, 3, 4, 5, 6, 8, 12 and 24 hours after the administration of the medication. For each of the four groups, the average VAS value was calculated.

For example, at 6 hours it was observed that the patients of Group 1, treated with the combination according to the present invention, achieved the greatest pain relief, with differences in the average pain intensity (Pain intensity difference, PID) of 9 mm, 13 mm and 18 mm vs. Group 2 (ibuprofen arginate), Group 3 (tramadol HCl) and Group 4 (placebo), respectively, as shown in Table 3 below (first lines, full population, basal VAS≥45 mm).

Furthermore, it was surprisingly found that such difference in VAS values, in general, increased in the patient subpopulations having higher basal VAS values (see Table 3, lines corresponding to basal VAS≥50, 55 and 60 mm). In other words, the superiority of the treatment according to the current invention (Group 1) vs. the comparators (Groups 2, 3 and 4) was still higher in those patients suffering from more intense pain.

TABLE 3

|  | Group | Group | PID, Mean differences (mm) | Patients |
|---|---|---|---|---|
| VAS t = 0 (≥45 mm) | 1 | 2 | 9 | 383 |
|  | 1 | 3 | 13 |  |
|  | 1 | 4 | 18 |  |
| VAS t = 0 (≥50 mm) | 1 | 2 | 14.9 | 202 |
|  | 1 | 3 | 17.5 |  |
|  | 1 | 4 | 25.7 |  |
| VAS t = 0 (≥55 mm) | 1 | 2 | 19.2 | 46 |
|  | 1 | 3 | 12.2 |  |
|  | 1 | 4 | 32.5 |  |
| VAS t = 0 (≥60 mm) | 1 | 2 | 15.2 | 30 |
|  | 1 | 3 | 12.3 |  |
|  | 1 | 4 | 30.6 |  |

As shown in Table 4 below, the number of patients requiring rescue medication in Group 1, taking the medication according to the present invention, was only the 4.2% of the patients, vs. 6.2%, 38.8% and 55.9% in Groups 2, 4 and 4, respectively.

TABLE 4

|  | Group 1 N = 95 | Group 2 N = 97 | Group 3 N = 98 | Group 4 N = 93 |
|---|---|---|---|---|
| Number of rescued patients | 4 | 6 | 38 | 52 |
| % of rescued patients | 4.2% | 6.2% | 38.8% | 55.9% |

The results show that the combination ibuprofen arginine/tramadol HCl 400/37.5 mg, according to the present invention, administered orally, is effective for the treatment of moderate to severe dental postoperative pain and is particularly effective for patients suffering from more intense pain. The results also show that such combination is more effective compared to ibuprofen arginine 400 mg, tramadol HCl 50 mg and placebo, and is safer compared to tramadol 50 mg.

Example 3 Comparative Clinical Trial to Assess the Efficacy of Oral Ibuprofen Arginate/Tramadol HCl (400/37.5) in Patients with Moderate to Intense Pain after Hysterectomy A phase III, multicentre, randomized, double-blind, placebo-controlled, study was performed to assess the compared efficacy and safety of the combination of ibuprofen arginate/tramadol HCl (400 mg ibuprofen/37.5 mg tramadol HCl) administered by the oral route, compared to oral tramadol (50 mg), oral ibuprofen arginate (400 mg ibuprofen) and placebo for treating adult patients (aged 18 or more) suffering from visceral moderate to intense pain after non-oncologic abdominal hysterectomy.

Pain intensity was assessed using the Visual Analogue Scale (VAS).

The patients selected for the study were adults suffering from moderate to severe pain (VAS 0-100≥40 mm) after total or partial abdominal hysterectomy for benign, non-oncologic disease, which required hospitalization during at least 48 hours.

The patients were divided in four groups, receiving the following medication:

Group 1: ibuprofen arginate/tramadol HCl 400 mg/37.5 mg (91 patients)
Group 2: ibuprofen arginate 400 mg (94 patients)
Group 3: tramadol HCl 50 mg (98 patients)
Group 4: placebo (93 patients)

The amount of ibuprofen arginate (400 mg) is expressed as the amount of ibuprofen in acidic form.

The combination of ibuprofen arginate/tramadol HCl administered to the patients of Group 1 was in the form of granulate for oral administration (as described in Example 4 below). Each dosage comprised 340 mg of L-arginine.

Patients of Group 2 received the commercial medicine Espidifen® 400 mg, each dose comprising 400 mg of ibuprofen, as 770 mg of ibuprofen arginate.

Patients of Group 3 received the commercial medicine Adolonta® 100 mg/ml oral solution, and a dose of 50 mg of tramadol HCl was administered.

After the surgery, the pain intensity of each patient was evaluated according to the VAS test until reaching the value ≥40 mm. At that moment, each patient was recruited and assigned to one of the four groups in a randomized way and the corresponding medication was administered. A new VAS test was performed after the administration of the first dose of the medication, which was taken as the basal value. Subsequently, 7 more doses of the assigned medication were administered, with an interval of 6 hours between doses, so a total of 8 doses were administered to each patient.

After the administration of the first dosage of each medication, the evolution of the patients was followed until 48 hours after the first dosage, by assessing the change in pain intensity.

After 30 minutes from the first dosage, patients were allowed to request a rescue medication, if needed. Rescue medication was 1 g paracetamol given by the oral route. If a second rescue medication was necessary, a capsule of 575 mg metamizole was administered.

Pain intensity was assessed for each patient at the following time points: 0 (basal), 1, 2, 4, 6, 8, 10, 12, 18, 24, 30, 36, 42 and 48 hours after the administration of the first dosage of the medication. For each of the four groups, the average VAS value was calculated at each time point.

It was found that the pain relief was superior for Group 1, compared to all the other groups during all the assessed period.

At 24 h time point, the difference in the average VAS value of Group 1 compared to Group 2 (ibuprofen), Group 3 (tramadol) and Group 4 (placebo) was of 7 mm, 12 mm and 22 mm, respectively, as shown in Table 5 below (first line, full population, basal VAS≥10 mm). Furthermore, it was surprisingly found that such differences (Pain intensity differences, PID) in VAS values, in general, increased in patient subpopulations having higher basal VAS values (see Table 5, lines corresponding to basal VAS≥50 and 60 mm). In other words, the superiority of the treatment according to the current invention (Group 1) vs. the comparators (Groups 2, 3 and 4) was still higher in those patients suffering from more intense pain.

TABLE 5

|  | Group | Group | PID, Mean differences (mm) | Patients |
|---|---|---|---|---|
| VAS t = 0 (≥40 mm) | 1 | 2 | 7 | 383 |
|  | 1 | 3 | 12 |  |
|  | 1 | 4 | 22 |  |
| VAS t = 0 (≥50 mm) | 1 | 2 | 12.4 | 170 |
|  | 1 | 3 | 13.9 |  |
|  | 1 | 4 | 29.1 |  |
| VAS t = 0 (≥60 mm) | 1 | 2 | 19.1 | 68 |
|  | 1 | 3 | 19.2 |  |
|  | 1 | 4 | 22.4 |  |

Compared to Tramadol (Group 3) and placebo (Group 4) the composition according to the present invention (Group 1) showed higher relief of pain, with differences higher than 1 cm in the VAS test from time point 6 h until the end of the study.

Group 1 was the only one showing reduction of pain (pain intensity difference, PID) larger than 10 mm during the 48 hours of the treatment, showing the highest difference at 12 hours.

Table 6 below shows the patients of each group which required rescue medication during the first 24 h of the study (Rescued patients at 24 h), and the total of patients taken rescue medication. The last line shows the average time until rescue medication was needed.

TABLE 6

|  | Group 1 N = 91 | Group 2 N = 94 | Group 3 N = 98 | Group 4 N = 93 |
|---|---|---|---|---|
| Total rescued patients | 15 (16.5%) | 23 (24.5%) | 31 (31.6%) | 45 (48.4%) |
| Rescued patients at 24 h | 11 (12.1%) | 21 (22.3%) | 28 (28.6%) | 44 (47.3%) |
| Average time until rescue (hours) | 10.61 | 8.43 | 8.97 | 6.58 |

There were no differences in the number of adverse effects reported in Group 1 (ibuprofen/tramadol) and in the Group 4 (placebo group), which supports the safety of the claimed combination.

The number of adverse effects reported in Group 3 (tramadol) was twice the number of adverse effects reported in Group 1 (ibuprofen/tramadol).

The results show that the combination ibuprofen arginine/tramadol HCl 400/37.5 mg, according to the present invention, administered orally, is effective for the treatment of moderate to severe visceral postoperative pain and is particularly effective for patients suffering from more intense pain. Such combination is more effective compared to ibuprofen arginine 400 mg, tramadol HCl 50 mg and placebo, and is safer than tramadol 50 mg.

Example 4 Preparation of an Oral Fixed-Dose Composition Comprising 400 mg of Ibuprofen (as Ibuprofen Arginate) and 37.5 mg of Tramadol Hydrochloride The oral composition prepared was in the form of granules for oral solution, i.e., intended to be dissolved in water before ingestion.

Each dose contained 1400 mg of granules, comprising 400 mg of ibuprofen, 340 mg of L-arginine and 37.5 mg of tramadol hydrochloride. The composition was filled into mono-dose sachets.

The list of ingredients is disclosed in Table 5:

TABLE 5

| Ingredients | % weight | mg/sachet |
|---|---|---|
| Ibuprofen | 28.571 | 400.00 |
| Tramadol HCl | 2.679 | 37.50 |
| L-Arginine | 25.428 | 340.00 |
| Sugar | 20-35 | 280-490 |
| Alkalinizing agent(s) | 2-3 | 28-42 |
| Disintegrant(s) | 2-7 | 28-98 |
| Wetting agent(s) | 0.02-0.1 | 0.28-1.4 |
| Glidant(s) | 1-4 | 14-56 |
| Sweetener(s) | 1-3 | 14-42 |
| Flavour(s) | 0.5-4.5 | 7-63 |
| Total | 100.000 | 1400.00 |

The granules were prepared following standard techniques, well known in the art. Thus, tramadol HCl and part of the sucrose were dissolved in purified water, to prepare the granulating solution. Ibuprofen, another part of the sucrose, the disintegrant(s) and the humectant(s) were first pre-blended and subsequently granulated by adding the granulating solution in a mixer. The granules were dried in fluidized bed and mixed with the extra-granular components (L-arginine, the rest of the sucrose, alkalinizing agent(s), sweeteners(s), flavour(s) and glidant(s)) and thoroughly mixed in a mixer. The obtained granules were filled into sachets, each containing 1400 mg. The molar ratio ibuprofen:arginine in the formulation was 1:1.0066.

Example 5 Preparation of an Intravenous Injectable Fixed-Dose Composition Comprising 400 mg of Ibuprofen (as Ibuprofen Arginate) and 37.5 mg of Tramadol Hydrochloride An aqueous injectable formulation for intravenous infusion was prepared. The unit dose was packed in bottles, each comprising 100 ml of the formulation. The ingredients used for preparing the intravenous injectable formulation are listed in Table 7:

TABLE 7

| Ingredients | mg/ml | mg/bottle |
|---|---|---|
| Ibuprofen | 4.00 | 400.00 |
| Tramadol HCl | 0.375 | 37.50 |
| L-Arginine | 3.56 | 356.00 |
| Sodium chloride | 9.04 | 904.00 |
| Hydrochloric acid | q.s. pH 6.8 ± 0.2 | q.s. pH 6.8 ± 0.2 |
| Sodium hydroxide | q.s. pH 6.8 ± 0.2 | q.s. pH 6.8 ± 0.2 |
| Water for injection | | q.s.100 ml |

The process of manufacture was as follows: A part of the water for injection (approximately 70%) was introduced in a reactor, and tramadol HCl, sodium chloride, arginine and ibuprofen were added, with continuous stirring, until a clear solution was obtained. The pH was adjusted with HCl/NaOH to the value 6.8±0.2. Finally, the remaining water was added until reaching the final volume. The solution obtained was filtered, filled into bottles and sterilized by autoclaving. The molar ratio ibuprofen:arginine in the formulation was 1:1.054.

The invention claimed is:

1. A method of treating pain in a human subject in need thereof comprising administering to said subject a combination of ibuprofen in the form of a pharmaceutically acceptable salt thereof and tramadol, or a pharmaceutical acceptable salt thereof, wherein the dosage of ibuprofen in the combination is comprised between 350 mg and 450 mg and the dosage of tramadol or a pharmaceutically acceptable salt thereof in the combination is comprised between 35 mg and 40 mg, expressed as equivalent weight of tramadol hydrochloride, and wherein the method does not involve administering any further active ingredient.

2. The method according to claim 1, wherein the ibuprofen pharmaceutically acceptable salt is selected from ibuprofen arginate, ibuprofen lysinate and ibuprofen sodium.

3. The method according to claim 2, wherein the ibuprofen pharmaceutically acceptable salt is ibuprofen arginate.

4. The method according to claim 1, wherein the dosage of ibuprofen is comprised between 390 mg and 410 mg.

5. The method according to claim 1, wherein the dosage of tramadol, or a pharmaceutically acceptable salt thereof, expressed as equivalent weight of tramadol hydrochloride, is comprised between 36 mg and 39 mg.

6. The method according to claim 1, wherein tramadol is in the form of tramadol hydrochloride.

7. The method according to claim 1, wherein the combination is administered by the oral route.

8. The method according to claim 1, wherein the combination is administered intravenously.

9. The method according to claim 1, wherein the method is for the treatment of acute pain or chronic pain.

10. The method according to claim 1, wherein the combination is administered in the form of a pharmaceutical composition comprising the fixed-dose combination of ibuprofen in the form of a pharmaceutically acceptable salt thereof and tramadol, or a pharmaceutically acceptable salt thereof, and at least one pharmaceutically acceptable excipient.

11. The method according to claim 10, wherein the pharmaceutical composition is for oral administration and is selected from the group consisting of granules, powders, tablets and capsules.

12. The method according to claim 10, wherein the pharmaceutical composition is an aqueous solution for intravenous injection.

13. A pharmaceutical composition for oral administration comprising about 37.5 mg of tramadol hydrochloride, about 400 mg of ibuprofen, arginine in an amount so that the molar ratio ibuprofen:arginine is comprised between 1.2:1 and 1:1.2, and at least one pharmaceutically acceptable excipient, wherein the pharmaceutical composition is selected from granules, tablets and capsules, and wherein the pharmaceutical composition does not comprise any further active ingredient.

14. An aqueous solution for intravenous injection comprising about 37.5 mg of tramadol hydrochloride, about 400 mg of ibuprofen, arginine in an amount so that the molar ratio ibuprofen:arginine is comprised between 1.2:1 and 1:1.2, and at last one pharmaceutically acceptable excipient, and wherein the aqueous solution does not comprise any further active ingredient.

15. The method according to claim 2, wherein the ibuprofen pharmaceutically acceptable salt is selected from ibuprofen arginate and ibuprofen lysinate.

16. The method according to claim 3, wherein the molar ratio ibuprofen:arginine is comprised between 1.2:1 and 1:1.2.

17. The method according to claim 4, wherein the dosage of ibuprofen is about 400 mg.

18. The method according to claim 5, wherein the dosage of tramadol, or a pharmaceutically acceptable salt thereof, expressed as equivalent weight of tramadol hydrochloride, is about 37.5 mg.

19. The method according to claim 9, wherein the pain is of moderate to severe intensity.

20. The method according to claim 9, wherein the pain is severe pain.

\* \* \* \* \*